United States Patent [19]
de Groot

[11] Patent Number: 5,473,434
[45] Date of Patent: Dec. 5, 1995

[54] PHASE SHIFTING INTERFEROMETER AND METHOD FOR SURFACE TOPOGRAPHY MEASUREMENT

[75] Inventor: Peter de Groot, Middletown, Conn.

[73] Assignee: Zygo Corporation, Middlefield, Conn.

[21] Appl. No.: 242,789

[22] Filed: May 16, 1994

[51] Int. Cl.$^6$ ..................................................... G01B 9/02
[52] U.S. Cl. ............................................................. 356/359
[58] Field of Search ................................... 356/359, 349, 356/345, 360

[56] References Cited

U.S. PATENT DOCUMENTS

| | | | |
|---|---|---|---|
| 4,576,479 | 3/1986 | Downs | 356/359 |
| 4,594,003 | 6/1986 | Sommargren | 356/359 |
| 4,606,638 | 8/1986 | Sommargren | 356/358 |
| 4,732,483 | 3/1988 | Biegen | 356/359 |
| 4,869,593 | 9/1989 | Biegen | 356/359 |
| 5,004,346 | 4/1991 | Kühel | 356/360 |
| 5,349,440 | 9/1994 | De Groot | 356/349 |

FOREIGN PATENT DOCUMENTS 4-297807  10/1992  Japan  ..................... 356/359

*Primary Examiner*—Samuel A. Turner
*Attorney, Agent, or Firm*—Cohen, Pontani, Lieberman & Pavane

[57] ABSTRACT

A system for measuring surface topography with notably decreased sensitivity to errors in phase and phase interval calibration and to the presence of low-frequency vibration during data acquisition includes an optical interferometer for developing interference data from the surface to be profiled, an electronic imaging system or camera for receiving the interference data, an arrangement for variably adjusting the reference phase of the interferometer illumination, and a digital signal processing device or computer for determining surface height from the interference data. A sequence of seven intensity images are detected by the imaging system and stored electronically. The intensity images correspond to interference patterns for seven different reference phase values spaced at intervals of approximately $\pi/2$. The images are processed by the computer so as to recover the surface topography. The invention differs substantially from the prior art in that the phase shifts need not be perfectly exact or repeatable, and neither is it necessary to completely eliminate low-frequency mechanical vibrations from the optical system during data acquisition. An alternative embodiment of the invention includes a laser diode-based illumination source that is operatively tuned in wavelength to effect the required phase shifts.

10 Claims, 3 Drawing Sheets

PHASE SHIFTING INTERFEROMETER AND METHOD FOR SURFACE TOPOGRAPHY MEASUREMENT

FIELD OF THE INVENTION

The present invention relates generally to precision optical metrology instrumentation for imaging and analysis of surfaces and, more particularly, to interferometer-based apparatus and methods for the profiling of surface topography.

BACKGROUND OF THE INVENTION

Among the most widely-used instruments for measuring surface topographies are interferometers, which use the wave nature of light to map variations in surface height with a high degree of accuracy. It is generally accepted in the art that the most accurate interferometers in common use today are based on the principle of phase shifting. Modern phase-shifting interferometers are typically comprised of an optical system, an electronic imaging system, a computer-based or otherwise automated controller, and means for introducing a reference phase shift. Phase shifting interferometry ("PSI") is, for example, described in detail in Chapter 14 of the book Optical Shop Testing, edited by Daniel Malacara (Wiley, New York, 1992). Briefly described, PSI typically involves the electronic storage of intensity patterns measured for a sequence of three to five reference phase shifts. These stored intensity patterns are then analyzed, as by a computer-based digital signal processor, to recover the original wavefront phase through analysis of the variations of intensity as a function of phase shift. When such PSI-based instruments are properly adjusted, they are capable of measuring surface topography with a resolution on the order of one-thousandth the wavelength of light.

Certain aspects of all prior an PSI instruments are critical to obtaining topographical surface measurements with the intended high degree of precision. These include precise adjustment of the reference phase and incremental phase changes during operation of the interferometer, and substantially complete isolation of the interferometer from vibration, most especially the low-frequency vibrations typical of most production environments.

Currently the most common method and arrangement for introducing the reference-phase shifts required for PSI is by mechanical translation or movement of the reference surface. The total amount of mechanical motion necessary for this purpose is normally less than the wavelength of light, and is often effected by controlled operation of a piezoelectric transducer (PZT), or equivalent assembly, which must be carefully (and often repeatedly) calibrated to provide suitably accurate and repeatable phase shifts. An alternative methodology known in the art involves selectively tuning the wavelength of the source light for the interferometer in such a way as to effect small phase shifts. This alternative method also requires careful calibration, and may even necessitate continuous monitoring of the source wavelength.

It is well known that distortions of the phase shift typically result in unacceptable measurement errors in prior art PSI instruments. Thus, significant errors can result when the reference phase shift is nonlinear or is not properly calibrated. In an article entitled Linear Approximation For Measurement Errors In Phase Shifting Interferometry, by J. van Wingerden, H. H. Frankena and C. Smorenburg, 30 Applied Optics 2718–29 (1991), these errors are described in some detail, including their form and magnitude. Several other articles, such as that by K. Kinnstatter, Q. W. Lohmann, J. Schwider and N. Streibl entitled Accuracy Of Phase Shifting Interferometry, 27 Applied Optics 5082–89 (1988), note the importance of careful calibration and suggest specific arrangements for measuring the magnitude of phase shifts. Deviations from linear motion are particularly troublesome in prior art PSI instruments, since even relatively small nonlinearities can lead to unacceptably large errors in the resulting surface height calculations. As a consequence, expensive and cumbersome high-voltage PZT assemblies must be employed to assure that the phase shift is as linear as possible, and time-consuming procedures must be performed to attain substantially perfect calibration of phase shifts. Problems associated with calibrating and linearizing wavelength shifts have also effectively precluded the widespread use of wavelength-tunable laser diodes in interferometers as an alternative to mechanical displacement of interferometer elements.

Low-frequency and other vibrations occurring during the interferometer data acquisition cycle also significantly distort the phase shifts, thus resulting in additional errors which in prior art instruments can only be avoided through careful elimination of all sources of vibration. Commonly-employed methods of vibration isolation involve the use of large granite or air-suspension tables, in conjunction with a heavy framework for supporting the interferometer optics. In addition, the measurement system must often be physically separated from production and assembly areas, resulting in significantly higher costs to manufacturing industries that use interferometers to verify the surface quality of manufactured articles.

There is therefore an unmet need for an apparatus and method for accurately measuring surface topography without dependence upon the high-precision phase shifting mechanisms and procedures and expensive vibration isolation arrangements of the prior art.

OBJECTS OF THE INVENTION

It is accordingly a principal object of the present invention to provide an improved method and apparatus for measuring the topography of a surface using phase-shifting interferometry.

It is a further object of the invention to measure surface topography with a very high degree of accuracy yet without requiring careful or precision calibration of the mechanism by which the phase shift is provided.

It is a further object of the invention to provide a method and apparatus by which unusually high measurement accuracies may be achieved using a low-cost phase shifting mechanism having significant nonlinear motion, the quality of such motion being incompatible or unacceptable for obtaining high accuracy surface topography measurements using prior art phase shifting interferometry methods and apparatus.

It is a further object of the invention to provide a method and apparatus by which very high measurement accuracies may be achieved using an inexpensive wavelength-tunable source such as a laser diode, the quality of the wavelength tuning being incompatible or unacceptable obtaining high accuracy surface topography measurements using prior art phase shifting interferometry methods and apparatus.

SUMMARY OF THE INVENTION

An apparatus constructed in accordance with the present invention for measuring surface topographies includes an optical interferometer for developing interference data from a surface to be profiled, an electronic imaging system for receiving the interference data from the interferometer, a computer-based controller and data analysis apparatus, and an apparatus or arrangement for variably adjusting the reference phase of the interferometer illumination. In accordance with a preferred method of the invention, a sequence of seven intensity images are detected by the imaging system and are electronically stored. These intensity images correspond to interference patterns or interferograms for seven different reference phase values spaced at intervals of approximately π/2. The phase value intervals (i.e. of approximately π/2) need not be perfectly the same and need not be repeatable, nor is it necessary that low-frequency vibrations be completely eliminated from the optical system during data acquisition for the intensity images. The seven interferograms are processed in the computer—utilizing a methodology heretofore unknown in the art—so as to recover from that data the topography of the surface under test. Alternative embodiments of the invention include a laser-diode based apparatus, and methods using six intensity flames, thirteen intensity flames, and combinations of two or more sets of intensity measurements obtained at different phase offsets.

Additional objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PREFERRED EMBODIMENTS

Figure 1:
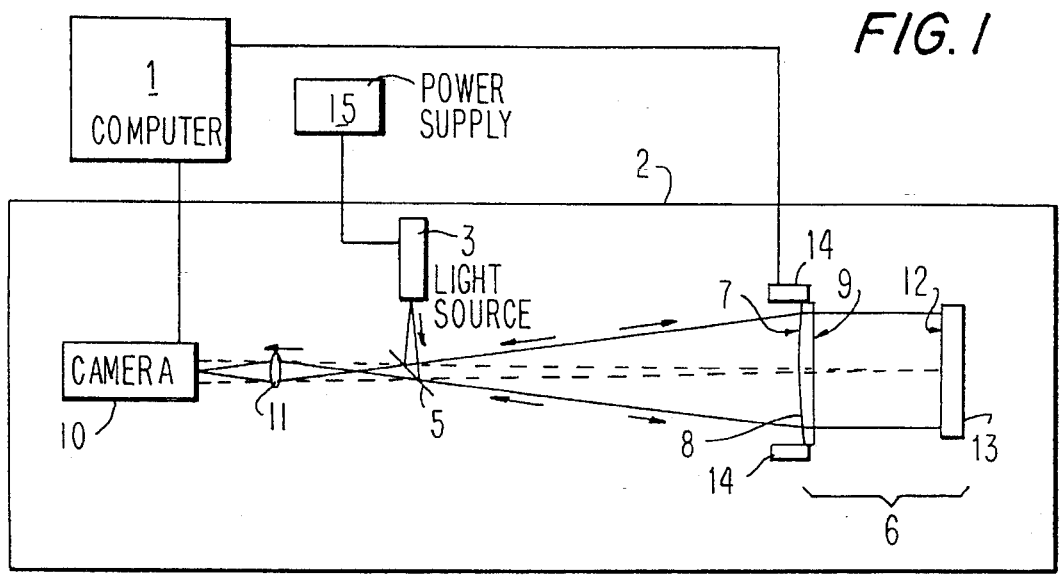
FIG. 1 is a block diagram representation of a phase shifting interferometer and associated apparatus constructed in accordance with a first embodiment of the invention and employing a mechanical reference phase shifting arrangement.

FIG. 1 diagrammatically depicts the basic elements of an apparatus constructed in accordance with a first preferred embodiment of the present invention and which is principally formed of a computer 1 and a phase shifting interferometer 2 of the well-known Fizeau geometry. In the preferred form of the apparatus herein described, the computer 1—which may be a digital signal processing apparatus specially constructed or adapted for this application or a general purpose computer that has been programmed to implement the herein-disclosed functionality—both controls the operation of the interferometer and receives and carries out the calculations on and analysis of the interference intensity data that is generated through operation of the interferometer in accordance with the invention. Optically equivalent interferometer geometries, such as of the Michelson or Twyman Green type, may alternatively be employed and should be understood as being within the intended scope and contemplation of this disclosure.

The interferometer 2 is illuminated by an optically coherent source 3—i.e. a source having sufficient spectral and spatial purity for performing interferometry with the Fizeau geometry shown in FIG. 1. The source 3 may by way of example be a laser of any of the common forms known in the art, such as a Helium Neon laser, and receives operating power from a power supply 15. Light from the source 3 is reflected by a beam splitter 5 and directed to a Fizeau interferometer cavity 6, at which the light is collimated by the convex surface 7 of a plano-convex lens 8. The plano side 9 of the lens 8 serves as a reference surface and reflects a portion of the light backwards through the beam splitter 5 to a camera 10 via an imaging lens 11. The camera 10 may be a standard video camera, charge-coupled device (CCD) or like apparatus for generating electronic images representative of the intensity of light impinging thereon. A portion of the light passing through the lens 8 is reflected from the front side 12 of an object 13 whose surface topography is to be measured. The light reflected from the object 13 is transmitted back through the beam splitter 5 to the camera 10, where it interferes with the light reflected from the reference surface 9. The interference phenomena result in an interferogram having an intensity distribution that is measured by the camera 10 and electronically transferred to the computer 1.

The interferometer 2 is operatively employed to measure the characteristics of the light reflected from the object or pan under test—more specifically the phase profile of the reflected wavefront. The camera-received intensity images are stored in the computer-based controller for a sequence of a predetermined plurality of substantially equally-spaced phase shifts. These phase shifts are produced by an assembly 14 which includes electro-mechanical means for physically displacing the lens 11 back and forth so as to vary the length of the Fizeau cavity 6; such physical displacement may, for example, be provided in a well known arrangement by a piezo-electric transducer (PZT) or the like. The computer 1 operatively controls this displacement of the lens 11, as by supplying a selectively-varying voltage to the PZT. Those skilled in the art will recognize that other arrangements for varying the length of the Fizeau cavity through physical displacement of pans or elements of the interferometer may alternatively be employed as a matter of design choice.

In accordance with a preferred method of the invention, a sequence of seven intensity images are stored in associated memory or otherwise recorded by the computer 1 during a linear displacement of the lens 11. Thus, for each image point there will be seven intensity values $g_j$ stored in computer memory, each equal to:

$$g_j = A \cdot (1 + V \cdot \cos(\Theta + \phi_j)), \qquad \text{Equation 1}$$

where V is the fringe visibility, A is an overall constant, and $j=0\ldots 6$ for the seven respective images. The reference phase shifts $\phi_j$ are $$\phi_j = (j-3)\frac{\pi}{2}. \qquad \text{Equation 2}$$

Thus the phase interval between images is (at least approximately) $\pi/2$ which, at a typical source illumination wavelength $\lambda$ of 633nm corresponds to a linear motion between successive images of 79nm. After recording the seven intensity images, the computer 1 calculates the wavefront phase $\Theta$ using the relationship $$\Theta = \tan^{-1}(T) \qquad \text{Equation 3}$$

where $$T = \frac{7(g_2 - g_4) - (g_0 - g_6)}{-4(g_1 + g_5) + 8g_3}. \qquad \text{Equation 4}$$

This calculation is performed for every image point in the field of view of the instrument to generate an accurate phase image representative of the wavefront reflected from the object. The surface height h corresponding to a wavefront phase $\Theta$ is then calculated for each image point using the formula $$h = \lambda \frac{\Theta}{4\pi}. \qquad \text{Equation 5}$$

In this manner the computer 1 calculates the height for every point in the image, yielding a three-dimensional topographical image of the object surface.

Figure 2:
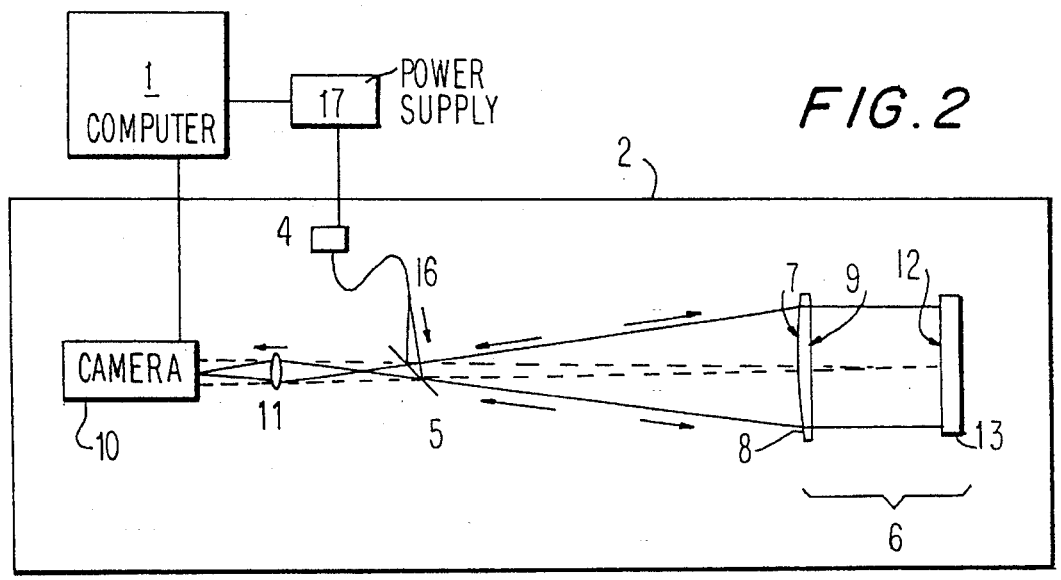
FIG. 2 is a block diagram representation of a phase shifting interferometer and associated apparatus constructed in accordance with a second embodiment of the invention and employing a wavelength-tunable laser-diode source for shifting or predetermined variation of the reference phase.

In a second, alternative apparatus embodiment of the invention depicted in FIG. 2, the shifting of phase in the interferometer between successive intensity images is achieved by selectively adjusting the wavelength of a tunable source 4 in a manner similar to that taught by Sommagren in U.S. Pat. No. 4,594,003 entitled Interferometric Wavefront Measurement. This so-called wavelength tuning is, in a preferred form of this second apparatus embodiment, performed automatically through computer-controlled operation of a laser diode power supply 17. However, instead of using four intensity image measurements as described in the Sommagren patent, the present invention contemplates that a sequence of seven intensity images corresponding to inter-image phase shifts of approximately $\pi/2$ be obtained and stored, as in computer memory. The computer 1 then uses Equations (3), (4) and (5) to calculate the surface topography of the object, where $\lambda$ in Equation (5) is the mean or average wavelength of the wavelength-tuned source.

The present invention differs fundamentally from prior art phase shifting interferometry in that, for all practical purposes, the method and apparatus of the invention are substantially insensitive to errors in the phase shift between successive intensity images—i.e. to errors by virtue of which the phase shift $\phi_j$ is in fact different than the expected or intended value. Assume, for purposes of description, that the actual phase shift $\phi_j$ is represented by $$\phi_j = \left(\frac{\pi}{2} + \epsilon + \frac{\gamma}{2}(j-3)\right)(j-3). \qquad \text{Equation 6}$$

In Equation (6), the coefficient $\epsilon$ represents an error in calibration and the coefficient $\gamma$ represents a quadratic nonlinearity in the phase shift. In prior art phase shifting interferometry, these coefficients are minimized to the greatest possible extent, as hereinabove described, since they will otherwise cause significant measurement errors in the resulting topographical profile. However, the method and apparatus of the present invention are for all practical purposes totally independent of these distortions, making it possible to use much less expensive phase-shifting mechanisms and minimizing or eliminating the need for the extensive calibration procedures that are absolute requirements of the prior art.

Figure 3:
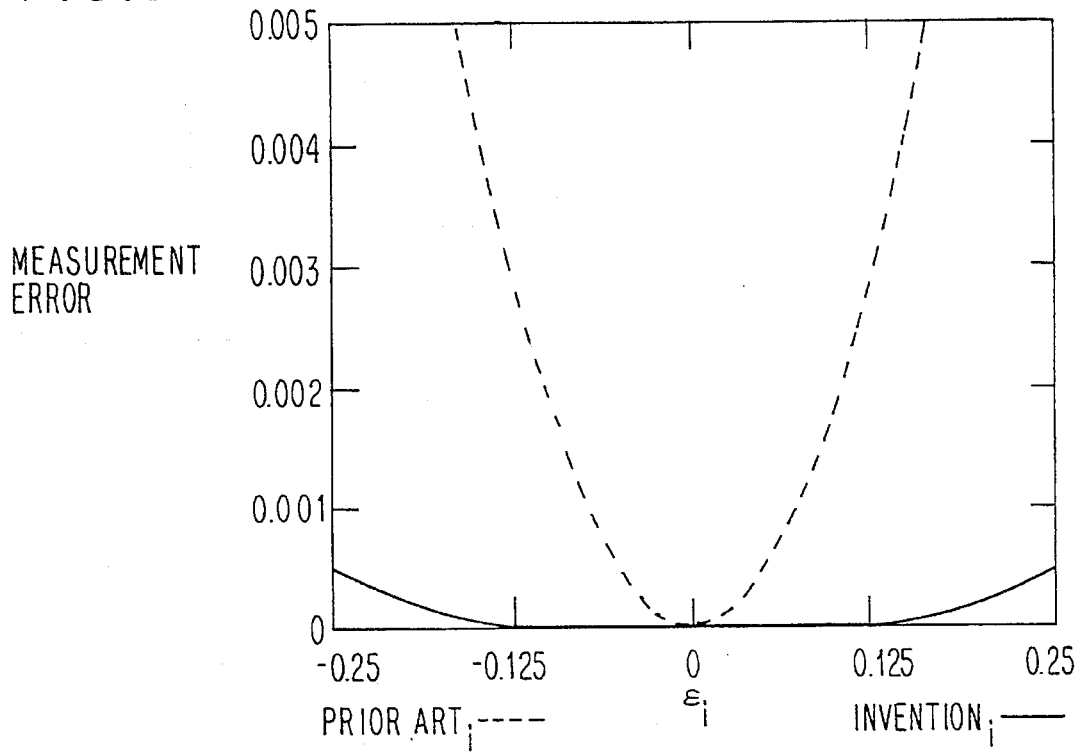
FIG. 3 is a graph comparing the performance of a phase shifting interferometer apparatus and method of the present invention with a representative prior art approach in the presence of phase-shift calibration errors.

FIG. 3 depicts a graph comparing the magnitudes of the resulting measurement error using the methods of the prior art, on the one hand, and of the present invention, on the other, as a function of the calibration coefficient $\epsilon$ in Equation (6). The prior art in this instance refers to that method described in the article by P. Hariharan, F. F. Oreb and T. Eiju entitled Digital Phase Shifting Interferometry: A Simple Error-Compensating Phase Calculation Algorithm, 26 Applied Optics 2504–06 (1987). That method is widely considered to be the best currently available for use in topographical surface analysis using phase shifting interferometry. As is clearly apparent in FIG. 3, the prior art method requires extremely precise calibration of the phase shift in order to maintain surface height determinations to accuracies of better than one-thousandth of a light wave. The inventive method and apparatus, on the other hand, provide highly accurate topographical surface measurements that are essentially independent of phase shift calibration.

Figure 4:
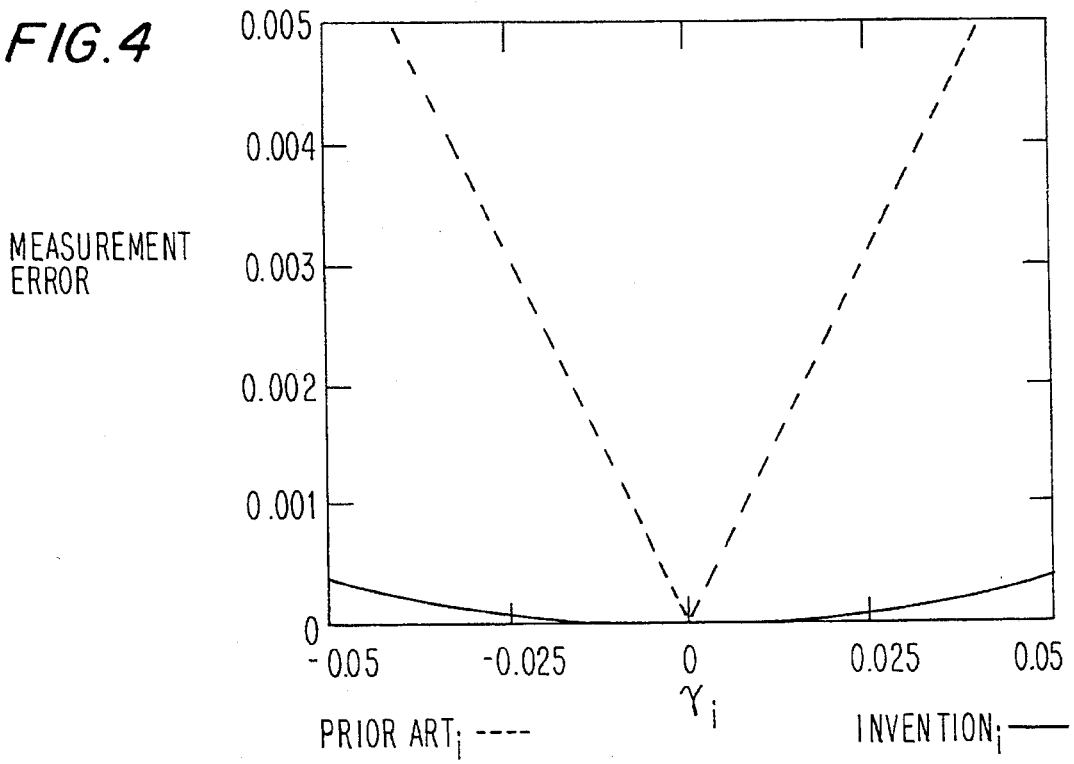
FIG. 4 is a graph comparing the performance of a phase shifting interferometer apparatus and method of the present invention with a representative prior art approach in the presence of phase-shift nonlinearity.

FIG. 4 similarly displays a graphical comparison of the magnitudes of measurement error for the prior art and the inventive methods, as a function of the nonlinear coefficient $\gamma$ in Equation (6). The FIG. 4 graph clearly demonstrates that the prior art requires nearly perfect linearity of the phase shift between successive intensity images in order to maintain surface height measurement accuracies of better than one-thousandth of a light wave. Once again, the inventive method provides for highly accurate measurement accuracies that are essentially independent of quadratic nonlinearities in the phase shift.

Figure 5:
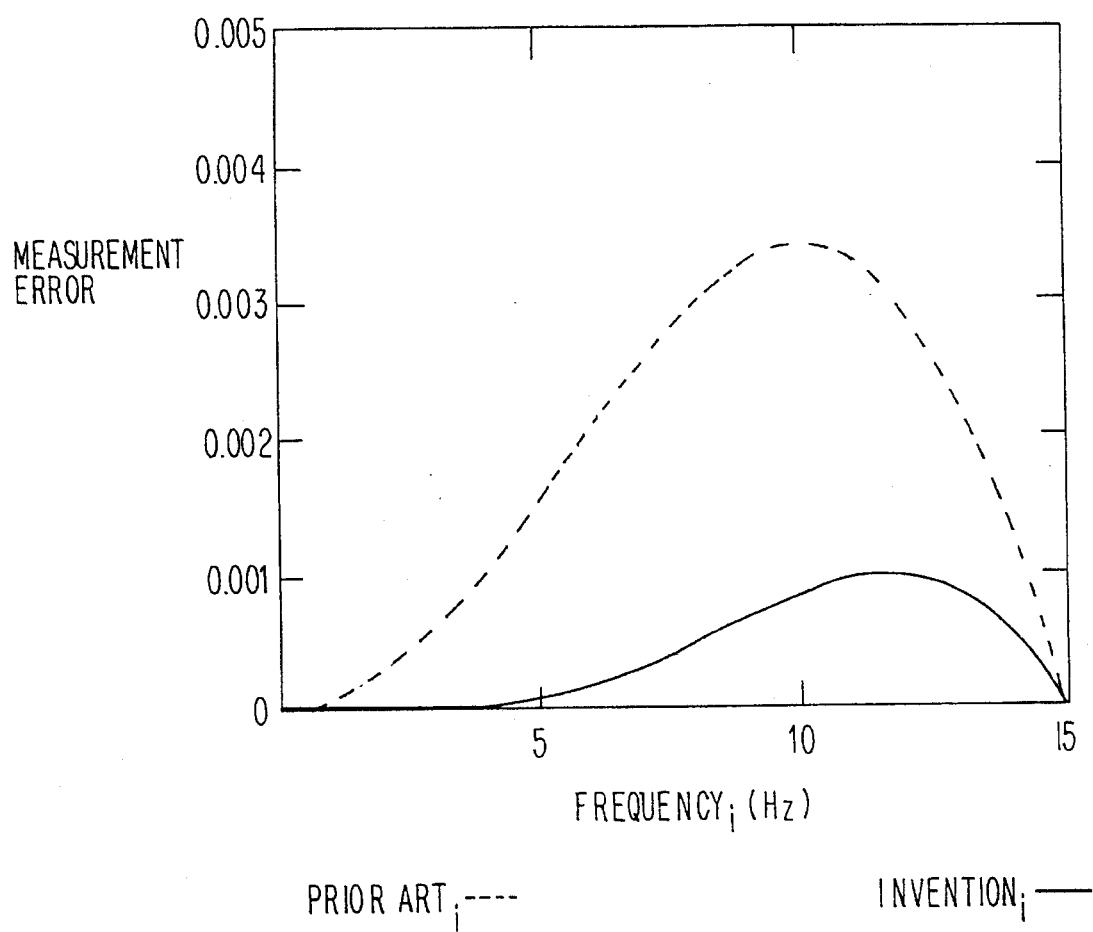
FIG. 5 is a graph comparing the performance of a phase shifting interferometer apparatus and method of the present invention with a representative prior art approach in the presence of low-frequency vibration.

Finally, FIG. 5 is a graph comparing the magnitudes of measurement error for the prior art and the inventive methods in the presence of low-frequency vibration. This graph relates measurement error to vibrational frequency for a prior art instrument equipped with a 60 Hz video camera. The amount of vibration is maintained at a fixed value over the frequency range, and corresponds to mechanical vibration in the interferometer cavity equal to about five-thousandths of a light wave. The FIG. 5 graph evidences significant surface height measurement errors for vibrations over the entire low-frequency range; these vibrational frequencies are particularly common in production environments and may for example be caused by heavy machinery, thermal motion, air currents and pedestrian traffic. Even a cursory review of the graphed data clearly reveals that prior art interferometers require extensive low-frequency vibration isolation to maintain high precision; the magnitude of measurement error for the inventive method and apparatus, on the other hand, is substantially reduced. The present invention thus significantly reduces or eliminates the heretofore-understood need for extensive vibration isolation of the interferometer instrument.

Although the currently most preferred embodiments of the invention employ the data obtained from seven interferograms, for some applications it may be advantageous to reduce the number of intensity images received and stored to six. Under such circumstances, the essential features and functionality of the invention are preserved by substituting the following equation in place of Equation (4):

$$T = \frac{3g_1 - 4g_3 + g_5}{-g_0 + 4g_2 - 3g_4},\quad \text{Equation 7}$$

where the six intensity images are denoted as j=0 . . . 5. While the performance of the invention will be somewhat reduced when using Equation (7) with six intensity images in lieu of Equation (4) with seven, this modified implementation of the inventive method is nevertheless still essentially independent of and insensitive to the calibration, linearity and vibration problems that are characteristic of the prior art.

Further alternative embodiments of the invention include systems which average two or more successive sets of measurements taken at different phase offsets. For example, in Fizeau cavities with highly-reflective reference and object surfaces, it is advantageous to apply Equation (4) to two different data sets respectively offset one to the other by $\pi/4$. Such an offset may be conveniently obtained by taking one data set of fourteen intensity frames at phase intervals of $\pi/4$. Equations (3) and (4) are then applied to the data collected for all even numbered frames or intensity images, and are then reapplied to the data for all odd-numbered frames. The final phase value is the average of the results of the two calculations.

A still further alternative embodiment that is also effective with Fizeau cavities and data with large amounts of intensity noise involves the recording of thirteen intensity frames (j=0 . . . 12) at phase intervals of $\pi/4$, and then calculating the surface heights as previously described but employing the following formula in lieu of Equation (4):

$$T = \frac{-3(g_0 - g_{12}) - 4(g_1 - g_{11}) + 12(g_3 - g_9) + 21(g_4 - g_8) + 16(g_5 - g_7)}{-4(g_1 + g_{11}) - 12(g_2 + g_3 + g_9 + g_{10}) + 16(g_5 + g_7) + 24g_6},\quad \text{Equation 8}$$

where $$g_j = A \cdot (1 + V \cdot \cos(\Theta + \phi_j))\quad \text{(Equation 1)}$$

and $$\phi_j = (j - 6)\frac{\pi}{4}.\quad \text{Equation 9}$$

These equations preserve the same benefits provided in accordance with the invention when using Equations (3) and (4) with data obtained from seven intensity image frames, while greatly increasing resistance to intensity noise present in the data.

While there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method of determining a height of a location on a surface, comprising the steps of:

positioning the surface along an optical axis of a phase shifting interferometer so that said location is optically aligned with an imaging device;

producing on the imaging device an interference pattern of the surface location using an optically coherent illumination source of wavelength $\lambda$;

operating the interferometer to produce on the imaging device intensity data $g_j$ for the surface location for seven frames j each successively shifted from the other by a phase difference of approximately $\pi/2$, wherein j=0 . . . 6 for said seven frames;

electronically storing the intensity data $g_j$ produced on the imaging device for said seven frames;

calculating a wavefront phase $\Theta$ for said surface location using the expression $$\Theta = \tan^{-1}\left(\frac{7(g_2 - g_4) - (g_0 - g_6)}{-4(g_1 + g_5) + 8g_3}\right);\text{ and}$$

calculating the height h of the surface location using the expression $$h = \lambda \frac{\Theta}{4\pi}.$$

2. A method in accordance with claim 1, wherein the interferometer comprises a Fizeau-type interferometer having a Fizeau cavity, and wherein said operating step further comprises varying a length of the Fizeau cavity along the optical axis so as to produce a phase shift of approximately $\pi/2$ between successive ones of the seven frames j.

3. A method in accordance with claim 1, wherein the illumination source comprises a wavelength-adjustable source, and wherein said operating step comprises adjusting the wavelength of the source so as to produce said phase shift of approximately $\pi/2$ between successive ones of the seven frames j.

4. A method in accordance with claim 1, further comprising the steps of:

operating the interferometer to produce on the imaging device intensity data $g_n$ for seven frames n each successively shifted from the other by a phase difference of approximately $\pi/2$, said seven frames n being interleaved with said seven frames j and being separated from said frames j by a phase difference of approximately $\pi/4$, wherein n=7 . . . 13 for said seven frames n;

electronically storing the intensity data $g_n$ produced on the imaging device for said seven frames n;

calculating a second wavefront phase $\Theta'$ for said surface location using the expression $$\Theta' = \tan^{-1}\left(\frac{7(g_9 - g_{11}) - (g_7 - g_{13})}{-4(g_8 + g_{12}) + 8g_{10}}\right);$$

and calculating an average wavefront phase $\Theta_{avg}$ using the expression $$\Theta_{avg} = \frac{(\Theta + \Theta')}{2};$$

wherein said step of calculating the height h of the surface location comprises using the average wavefront phase $\Theta_{avg}$ in the expression $$h = \lambda \frac{\Theta_{avg}}{4\pi}.$$

5. A method of determining a height of a location on a surface, comprising the steps of:

positioning the surface along an optical axis of a phase shifting interferometer so that said location is optically aligned with an imaging device;

producing on the imaging device an interference pattern of the surface location using an optically coherent illumination source of wavelength $\lambda$;

operating the interferometer to produce on the imaging device intensity data $g_j$ for the surface location for six frames j each successively shifted from the other by a phase difference of approximately $\pi/2$, wherein $j=0 \ldots 5$ for said six frames;

electronically storing the intensity data $g_j$ produced on the imaging device for said six frames;

calculating a wavefront phase $\Theta$ for said surface location using the expression $$\Theta = \tan^{-1}\left(\frac{3g_1 - 4g_3 + g_5}{-g_0 + 4g_2 - 3g_4}\right); \text{ and}$$

and calculating the height h of the surface location using the expression $$h = \lambda \frac{\Theta}{4\pi}.$$

6. A method in accordance with claim 5, wherein the interferometer comprises a Fizeau-type interferometer having a Fizeau cavity, and wherein said operating step further comprises varying a length of the Fizeau cavity along the optical axis so as to produce a phase shift of approximately $\pi/2$ between successive ones of the six frames j.

7. A method in accordance with claim 5, wherein the illumination source comprises a wavelength-adjustable source, and wherein said operating step comprises adjusting the wavelength of the source so as to produce said phase shift of approximately $\pi/2$ between successive ones of the six frames j.

8. A method of determining a height of a location on a surface, comprising the steps of:

positioning the surface along an optical axis of a phase shifting interferometer so that said location is optically aligned with an imaging device;

producing on the imaging device an interference pattern of the surface location using an optically coherent illumination source of wavelength $\lambda$;

operating the interferometer to produce on the imaging device intensity data $g_j$ for the surface location for thirteen flames j each successively shifted from the other by a phase difference of approximately $\pi/4$, wherein $j=0 \ldots 12$ for said thirteen flames;

electronically storing the intensity data $g_j$ produced on the imaging device for said thirteen flames;

calculating a wavefront phase $\Theta$ for said surface location using the expression $$\Theta = \tan^{-1}\left(\frac{\begin{array}{c}-3(g_0 - g_{12}) - 4(g_1 - g_{11}) + 12(g_3 - g_9) + \\ 21(g_4 - g_8) + 16(g_5 - g_7)\end{array}}{\begin{array}{c}-4(g_1 + g_{11}) - 12(g_2 + g_3 + g_9 + g_{10}) + \\ 16(g_5 + g_7) + 24g_6\end{array}}\right);$$

and calculating the height h of the surface location using the expression $$h = \lambda \frac{\Theta}{4\pi}.$$

9. A method in accordance with claim 8, wherein the interferometer comprises a Fizeau-type interferometer having a Fizeau cavity, and wherein said operating step further comprises varying a length of the Fizeau cavity along the optical axis so as to produce a phase shift of approximately $\pi/2$ between successive ones of the thirteen flames j.

10. A method in accordance with claim 8, wherein the illumination source comprises a wavelength-adjustable source, and wherein said operating step comprises adjusting the wavelength of the source so as to produce said phase shift of approximately $\pi/2$ between successive ones of the thirteen flames j.

* * * * *